(12) United States Patent
Busaba et al.

(10) Patent No.: US 8,099,451 B2
(45) Date of Patent: Jan. 17, 2012

(54) SYSTEMS AND METHODS FOR IMPLEMENTING LOGIC IN A PROCESSOR

(75) Inventors: Fadi Yusuf Busaba, Poughkeepsie, NY (US); Bryan Lloyd, Austin, TX (US); Michael Thomas Vaden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 12/053,038

(22) Filed: Mar. 21, 2008

(65) Prior Publication Data

US 2008/0168115 A1     Jul. 10, 2008

Related U.S. Application Data

(63) Continuation of application No. 11/047,501, filed on Jan. 31, 2005, now abandoned.

(51) Int. Cl.
    *G06F 7/50*     (2006.01)
(52) U.S. Cl. .......................................... 708/703; 326/53
(58) Field of Classification Search .................. 708/490, 708/700, 703; 326/53
    See application file for complete search history.

(56) References Cited

U.S. PATENT DOCUMENTS

| | | | |
|---|---|---|---|
| 3,843,876 A | 10/1974 | Fette et al. | |
| 4,592,005 A * | 5/1986 | Kregness | ..................... 708/490 |
| 4,745,306 A | 5/1988 | Shimada | |
| 4,882,698 A * | 11/1989 | Young | ........................ 708/230 |
| 5,299,319 A * | 3/1994 | Vassiliadis et al. | ............ 712/221 |
| 5,442,801 A * | 8/1995 | Sato et al. | ..................... 708/200 |
| 6,140,839 A * | 10/2000 | Kaviani et al. | .................. 326/39 |
| 6,781,412 B2 | 8/2004 | Yoshida et al. | |

* cited by examiner

*Primary Examiner* — Chuong D Ngo
(74) *Attorney, Agent, or Firm* — Frances Lammes; Stephen J. Walder, Jr.; Matthew B. Talpis

(57) ABSTRACT

Systems, methods and media for implementing logic in the arithmetic/logic unit of a processor are disclosed. More particularly, hardware is disclosed for computing logical operations with minimal hardware by organizing the execution unit such that the propagate and generate functions required for the adder can be used as a basis to implement the bitwise logical instructions. The result of these functions is computed before execution of the instruction by an execution macro in the arithmetic/logic unit.

20 Claims, 6 Drawing Sheets

SYSTEMS AND METHODS FOR IMPLEMENTING LOGIC IN A PROCESSOR

This application is a continuation of U.S. application Ser. No. 11/047,501, filed Jan. 31, 2005 now abandoned.

FIELD

The present invention is in the field of implementing logic in a processor. More particularly, the invention simplifies the circuitry needed to implement logic functions in an arithmetic/logic unit of a computer processor.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many systems to increase performance in a relatively cost-effective manner. Many modern computers also support "multi-tasking" or "multi-threading" in which two or more programs run concurrently with various resources in the processor pipeline allocated to two different threads on any given cycle.

Modern computers include at least a first level cache L1 and typically a second level cache L2, for increasing the speed of memory access by the processor. This dual cache memory system enables storing frequently accessed data and instructions close to the execution units of the processor to minimize the time required to transmit data to and from memory. L1 cache is typically oil the same chip as the execution units. L2 cache is external to the processor chip but physically close to it. Ideally, as the time for execution of an instruction nears, instructions and data are moved to the L2 cache from a more distant memory. When the time for executing the instruction is near imminent, the instruction and its data, if any, is advanced to the L1 cache.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. These execution units typically comprise load/store units, integer Arithmetic/Logic Units, floating point Arithmetic/Logic Units, and Graphical Logic Units. In an architecture with multiple execution units, instructions can be issued to two or more of these units to be executed in parallel.

The Arithmetic/Logic Unit (ALU) performs arithmetic operations and logic operations on operands provided to it. For example, FIG. 1 shows a typical architecture of an arithmetic/logic unit in a digital processor. Two N:1 multiplexers, 102 and 104 receive operands from different sources. One such source is the result of instructions that are just finishing execution received from 4:1 multiplexer 118. Each operand, A and B, is latched in latches 106 and 108, respectively. The latch contents are forwarded to the execution macros: an adder 110, a rotator 112, a logical unit 114, and other functions unit 116.

Adder 110 adds the operands, A and B, received from latches 106 and 108. To perform the addition the adder must perform a Generate function 120 and a Propagate function 122. The Generate function is the bitwise logical AND of the two operands. The Propagate function is the bitwise logical OR of the two operands. Rotator 112 receives an operand sand rotates it. Logical unit 114 performs various logical functions such as AND, OR, XOR, etc. In a PowerPC architecture there are 8 basic types of logical operations provided by the Instruction Set Architecture (ISA). These are: AND, NAND, OR, NOR, ANDC, ORC, XOR, and EQV. Their values are given in Table 1.

TABLE 1

| A | B | A and B | A nand B | A or B | A nor B | A andc B | A orc B | A xor B | A eqv B |
|---|---|---------|----------|--------|---------|----------|---------|---------|---------|
| 0 | 0 | 0 | 1 | 0 | 1 | 0 | 1 | 0 | 1 |
| 0 | 1 | 0 | 1 | 1 | 0 | 0 | 0 | 1 | 0 |
| 1 | 0 | 0 | 1 | 1 | 0 | 1 | 1 | 1 | 0 |
| 1 | 1 | 1 | 0 | 1 | 0 | 0 | 1 | 0 | 1 |

FIG. 2 shows an embodiment of a logical unit 114. The operands and their complements are input to certain ones of three-input NAND gates 202, 204, 206, and 208 as shown. The output of these NAND gates is a 4-input NAND gate 210. Selectors C1, C2, C3, and C4 determine the operation performed. By appropriate selection, all eight of the logical operations of Table 1 can be performed. This logic configuration requires a considerable amount of circuitry for its implementation, and thus, more surface area on the processor chip. Further, the logic is slow because the data flows through two stages of multiple input gates.

Thus, there is a need for logic implementation in the arithmetic/logic unit of a digital processor that increases speed and requires less circuitry to implement.

SUMMARY

The problems identified above are in large part addressed by systems, methods and media for implementing logic in a digital processor as disclosed herein. In one embodiment, a digital system with an arithmetic/logic unit for executing arithmetic and logical instructions comprises a circuit arrangement that minimizes the circuitry required to perform basic logic operations. Propagate and Generate functions are performed and the results are then sent to execution macros for executing the instruction.

Embodiments comprise a method to output a result of a logical operation with two operands for an instruction identifying the logical operation in an arithmetic/logic unit of a processor. The method comprises receiving, by a generate function circuit and a propagate function circuit of the arithmetic/logic unit, the two operands; computing, by the generate function circuit, a generate function result; computing, by the propagate function circuit, a propagate function result, wherein the generate function result is a logical AND and the propagate function result is a logical OR of the two operands or the generate function result is a logical NAND and the propagate function result is a logical NOR of the two operands; and computing the result of the logical operation to output the result, wherein computing the result comprises: shifting, by a rotator, the generate function result by zero to output the generate function result if the instruction identifies a logical AND or NAND operation; and computing, by the execution macro circuitry, a logical NAND or a logical AND of the generate function result and the propagate function result to produce a logical XOR of the two operands if the instruction identifies a logical XOR or EQV operation.

One embodiment, comprises an arithmetic/logic unit to output a result of a logical operation in response to an instruction identifying the operation, comprising a generate function circuit to receive two operands and to compute a generate function result; a propagate function circuit to receive the two operands and to compute a propagate function result, wherein the generate function result is a logical AND and the propagate function result is a logical OR of the two operands or the generate function result is a logical NAND and the propagate function result is a logical NOR of the two operands; and execution macro circuitry to receive the generate function result and the propagate function result and to compute the result of the logical operation to output the result, wherein computing the result comprises shifting the generate function result by zero to output the generate function result if the instruction identifies a logical AND or NAND operation, and computing a logical NAND or a logical AND of the generate function result and the propagate function result to produce a logical XOR of the two operands if the instruction identifies a logical XOR or EQV operation.

In another embodiment, a computer system for processing instructions and data, comprises a memory for storing the instructions and data; and a processor coupled with the memory to process the instructions and the data, the processor comprising execution units to perform operations in accordance with the instructions, wherein the execution units comprise an arithmetic/logic unit, the arithmetic/logic unit to output a result of a logical operation in response to an instruction identifying the logical operation comprising: a generate function circuit to receive two operands and to compute a generate function result; a propagate function circuit to receive the two operands and to compute a propagate function result, wherein the generate function result is a logical AND and the propagate function result is a logical OR of the two operands or the generate function result is a logical NAND and the propagate function result is a logical NOR of the two operands; and execution macro circuitry to receive the generate function result and the propagate function result and to compute the result of the logical operation to output the result, wherein computing the result comprises shifting the generate function result by zero to output the generate function result if the instruction identifies a logical AND or NAND operation, and computing a logical NAND or a logical AND of the generate function result and the propagate function result to produce a logical XOR of the two operands if the instruction identifies a logical XOR or EQV operation.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

In one embodiment, a digital system comprises a processor with a plurality of execution units, including an Arithmetic/Logic Unit (ALU), for executing instructions. The processor receives instructions from an instruction cache, decodes them and distributes them to the appropriate execution units. The ALU comprises a circuit arrangement that substantially reduces the circuitry required to execute basic logic instructions. In particular, the ALU computes a Propagate function and a Generate function prior and sends the results to execution macros within the ALU which execute the instruction. The ALU provides complementation circuitry within the execution macros so that at least 8 logical operations are implemented.

Figure 3:
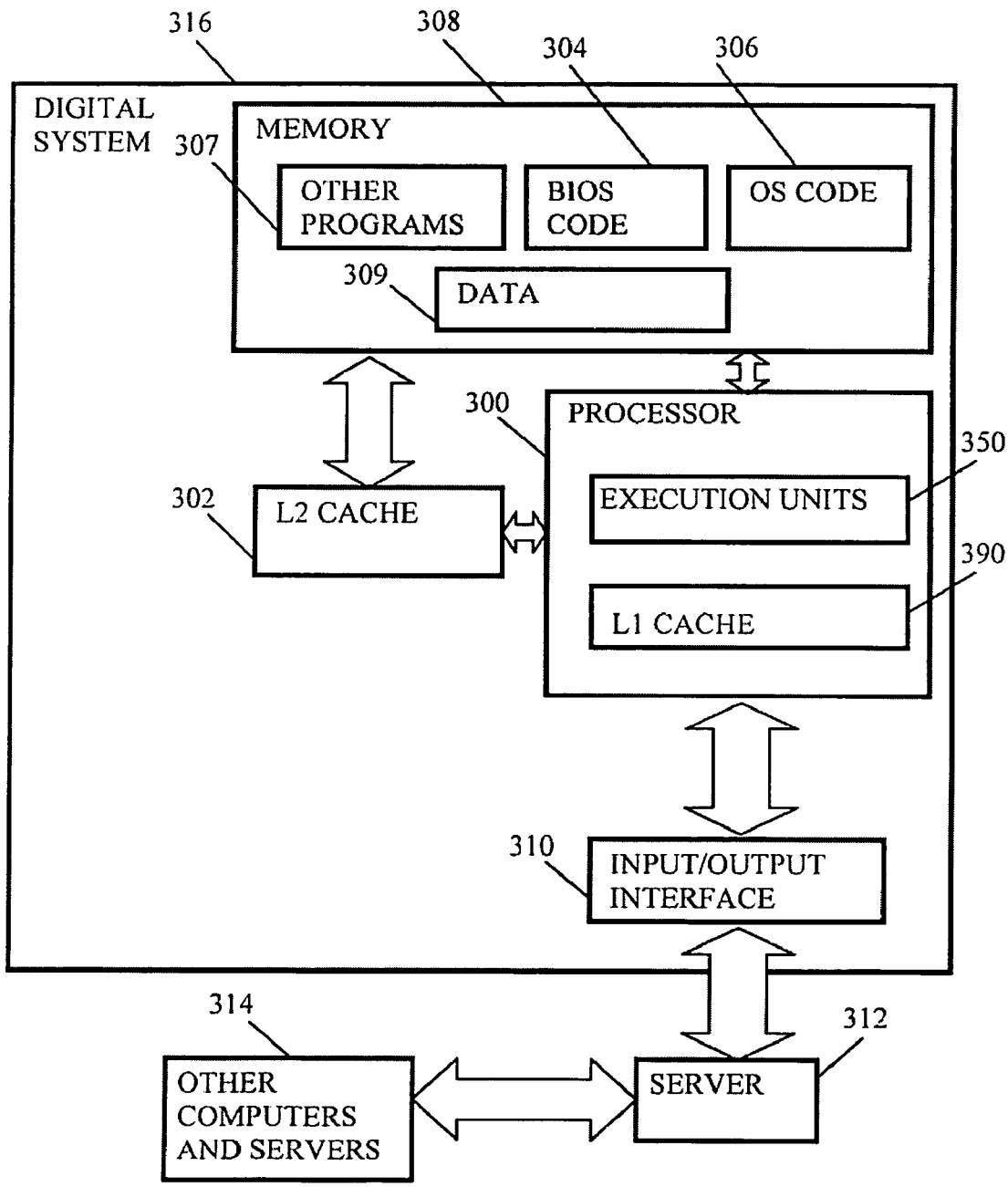
FIG. 3 depicts a digital system comprising a processor and cache memory.

FIG. 3 shows a digital system 316 such as a computer or server implemented according to one embodiment of the present invention. Digital system 316 comprises a processor 300 that can operate according to BIOS Code 304 and Operating, System (OS) Code 306. The BIOS and OS code is stored in memory 308. The BIOS code is typically stored on Read-Only Memory (ROM) and the OS code is typically stored on the hard drive of computer system 316. Memory 308 also stores other programs for execution by processor 300 and stores data 309 Digital system 316 comprises a level 2 (L2) cache 302 located physically close to processor 300. Processor 300 comprises an on-board level one (L1) cache 390 and execution units 350 where instructions are executed.

Digital system 316 also typically includes other components and subsystems not shown, such as: a Trusted Platform Module, memory controllers, random access memory (RAM), peripheral drivers, a system monitor, a keyboard, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 300 may also communicate with a server 312 by way of Input/Output Device 310. Server 312 connects system 316 with other computers and servers 314. Thus, digital system 316 may be in a network of computers such as the Internet and/or a local intranet.

In one mode of operation of digital system 316, data and instructions expected to be processed in a particular order in the processor pipeline of processor 300 are received by the L2 cache 302 from memory 308. L2 cache 302 is fast memory located physically close to processor 300 to achieve greater speed. The L2 cache receives from memory 308 the instructions for a plurality of instruction threads that are preferably independent; that is, execution of an instruction of one thread does not first require execution of an instruction of another thread. Normally this is the case when data from one thread is not required by another thread. The L1 cache 390 is located in processor 300 and contains data and instructions preferably received from L2 cache 302. Ideally, as the time approaches for a program instruction to be executed, it is passed with its data, if any, first to the L2 cache, and then as execution time is near imminent, the instruction is passed to the L1 cache 390.

Execution units 350 execute the instructions received from the L1 cache 390. Execution units 350 may comprise load/store units, integer Arithmetic/Logic Units, floating point Arithmetic/Logic Units, and Graphical Logic Units. Execution units 350 comprise stages to perform steps in the execution of instructions. Data processed by execution units 350 are storable in and accessible from integer register files and floating point register files. Data stored in these register files can also come from or be transferred to on-board L1 cache 390 or an external cache or memory.

Figure 4:
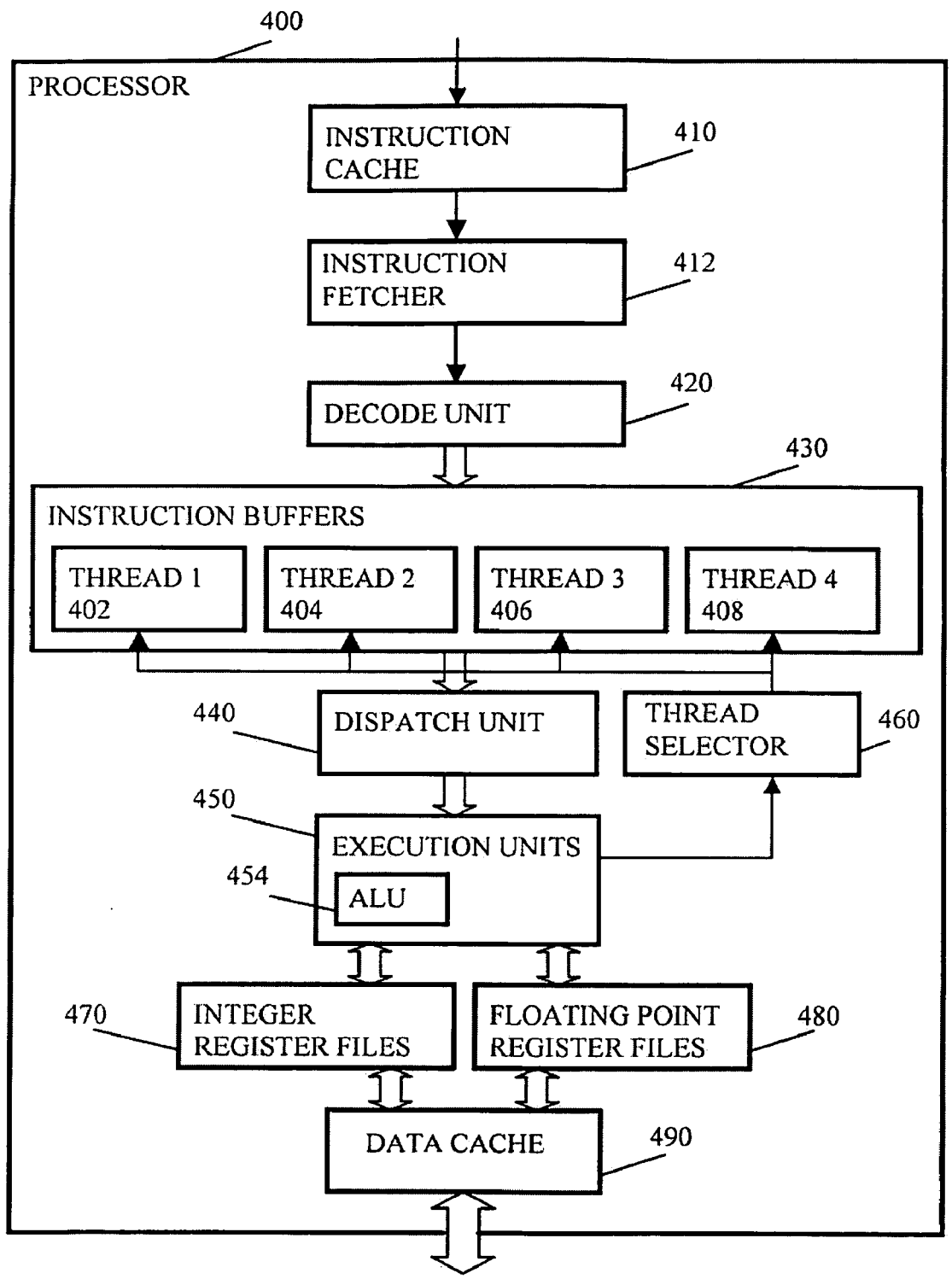
FIG. 4 depicts a multi-threading processor with a thread multiplexer for selecting thread instructions to be processed by the multi-threading processor.

FIG. 4 shows an embodiment of a 4-thread multi-threading processor 400 that can be implemented in a digital system such as digital system 316. A level 1 instruction cache 410 receives instructions from memory external to the processor, such as level 2 cache. In one embodiment, as instructions for different threads approach a time of execution, they are transferred from a more distant memory to an L2 cache. As execution time for an instruction draws near it is transferred from the L2 cache to the L1 instruction cache 410. An instruction fetcher 412 maintains a program counter and fetches instructions from instruction cache 410. The program counter of instruction fetcher 412 normally increments to point to the next instruction to be executed, but in the case of a branch instruction, for example, the program counter can be set to point to a branch destination address to obtain the next instruction.

Instruction fetcher 412 transfers instructions received from instruction cache 410 to a decode unit 420. Decode unit 420 decodes the instructions received from instruction cache 410. An instruction comprises an operation code (OPcode), a destination address, a first operand address and a second operand address:

| OPCODE | Destination Address | First Operand Address | Second Operand Address |
|---|---|---|---|

The OPcode is a binary number that indicates the arithmetic, logical, or other operation to be performed by the execution units 450. When an instruction is executed, the processor passes the OPcode to control circuitry that directs the appropriate one of execution units 450 to perform the operation indicated by the OPcode. The first operand address and second operand address locate the first and second operands in a memory data register. The destination address locates where to place the results in the memory data register. Ideally, the data in the memory data register at the operand addresses will be computed by a recent previous instruction or received in time from the L1 data cache.

The decoded instructions are passed on a bus to instruction buffers 430. In a multi-threading processor, instruction buffers 430 comprise a memory location for the instructions of each of a plurality of threads to be processed. Thus, in the 4-thread system shown in FIG. 4, there are buffers 402, 404, 406 and 408 for instructions from threads 1, 2, 3 and 4, respectively. Each memory location can be addressed by an address received from a thread selector 460. Each of the four memory locations contains an instruction of a different one of the four threads. Addressing a memory location with the address received from thread selector 460 places the contents of the memory location on a bus to be transferred to a dispatch unit 440.

Instruction buffer 430 may also comprise an instruction queue and a recirculation buffer to handle stalled instructions. If an instruction is stalled because of, for example, a data cache miss, the instruction can be stored in the recirculation buffer until the required data is retrieved. When the required data is received into a memory data register, the instruction is moved from the recirculation buffer to be dispatched by dispatch unit 440. This is faster than retrieving the instruction from the instruction cache.

Dispatch unit 440 dispatches thread instructions selected by thread selector 460 to execution units 450. Execution units 450 comprise stages to perform steps in the execution of instructions received from dispatch unit 440. Data processed by execution units 450 are storable in and accessible from integer register files 470 and floating point register files 480. Data stored in these register files can also come from or be transferred to an on-board data cache 490 or an external cache or memory. Each stage of execution units 450 is capable of performing a step in the execution of an instruction of a different thread. The instructions of threads can be submitted by dispatch unit 440 to execution units 450 in a preferential order. In a superscalar architecture, execution units 450 may comprise load/store units, integer Arithmetic/Logic Units, floating point Arithmetic/Logic Units, and Graphical Logic Units. Instructions can be submitted to different execution units for execution in parallel.

Figure 5:
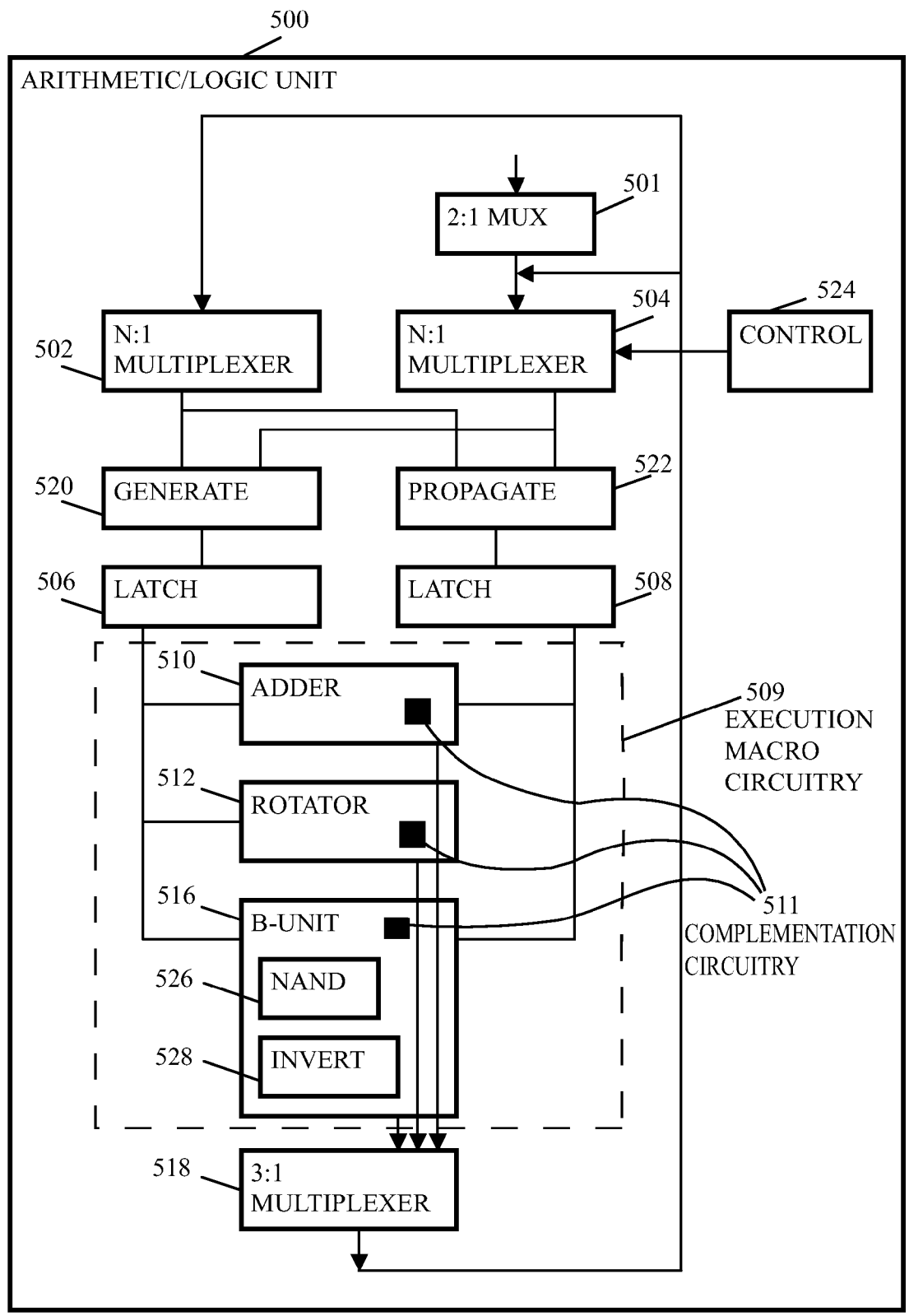
FIG. 5 depicts an arithmetic/logic unit with a reduced-circuitry implementation.

In particular execution units 450 comprise an Arithmetic Logic Unit (ALU) 454. ALU 454 comprises circuitry for performing arithmetic functions and logic functions. FIG. 5 shows an embodiment of an ALU 500 with a reduced circuitry implementation. Two N:1 multiplexers 502 and 504 may receive operands from multiple sources and multiplex them into a sequential stream of operands. One such source is the result of instructions that are just finishing execution received from 3:1 result multiplexer 518. For example, the following sequence of instructions,

ADD G0, G1, G2
ADD G3, G0, G4 calls for the output of the first ADD function, G0, as an input to the second ADD function. Thus, for this sequence of instructions, one of the multiplexers 502 or 504 will select the output of result multiplexer 518 to provide as an input to the propagate function 522 and to the generate function 520.

Multiplexers 502 and 504 select among the received operands and output two operands, A and B, that are received by Generate and Propagate functions 520 and 522. Generate function 520 computes the logical AND of operands A and B. Propagate function 522 computes the logical OR of operands A and B. One of skill in the art will readily understand that an alternative embodiment would comprise computing the logical NAND and the logical NOR of the two operands.

The system places the result of Generate function 520 in latch 506 and the result of Propagate function 522 in latch 508. The contents of latches 506 and 508 are forwarded to the execution macro circuitry 509: adder 510, rotator 512, and B-unit 516. Adder 510 completes the operations to add the operands, A and B, received from latches 506 and 508. The Generate and Propagate functions 520 and 522 necessary to perform the addition are computed external to the Adder 510. Thus, in contrast to the prior art, where the propagate and generate functions are computed in the adder, the present invention provides for computation of these functions before the adder 510. Thus, the execution macro circuitry 509 receives not the operands, but rather, the AND (NAND) and OR (NOR) of the operands.

The function of rotator 512 is to rotate an operand. When ALU 500 receives a rotate instruction, the Generate function 520 must produce the operand A to execute the rotate instruction. Since the Generate function 520 is the logical AND of A and B, the Generate function 520 will produce A when B is forced to logical one. Therefore, a control circuit 524 connects to multiplexer 504 to force B to a logical one. Thus, when a rotate instruction is received, control circuit 524 receives a signal that causes it to communicate with multiplexer 504, forcing the output of multiplexer 504 to logical 1. Then, A AND B equals A, and A is therefore sent to the rotate macro.

When an instruction is received that requires the computation of A AND B, the result of Generate function 520 is received by rotator 512. The rotator 512 may be commanded to shift by zero. The output of the rotator 512 is therefore A AND B. This result is then passed to result multiplexer 518. Alternatively, the rotator 512 may complement the result of A AND B, before passing it to result multiplexer 518. When an instruction is received that requires the computation of A OR B, the result of Propagate function 522 is passed through B-unit 516 to result multiplexer 518. Alternatively, the B-unit 516 may complement the result of A OR B, before passing it to result multiplexer 518. The B-unit 516 also performs miscellaneous functions including sign-extensions and the like.

Thus, each execution macro circuit 510, 512, and 516, may be implemented with complementation circuitry 511 to determine the complement of the result of the Generate function 520 and to determine the complement of the result of the Propagate function 522. This produces A NAND B and A NOR B. The result, A NAND B, may be obtained from rotator 512 by commanding the rotator 512 to shift by zero and complementing the result. The result, A NOR B, may be obtained by complementing A OR B in B-unit 516. Similarly, the generate function 520 could be implemented to compute A NAND B and the propagate function 522 could be implemented to compute A NOR B. Then, complementation circuitry 511 in the execution macro circuitry 509 can produce A AND B and A OR B.

A 2:1 multiplexer 501 is provided to select between B and its complement, BC. When BC is selected, the Generate function 520 computes A ANDC B and the Propagate function 522 computes A ORC B. Thus, when an instruction is received that requires the computation of A ANDC B, the result of Generate function 520 is received by rotator 512. The rotator 512 may be commanded to shift by zero. The result is then passed to result multiplexer 518. When an instruction is received that requires the computation of A ORC B, the result of Propagate function 522 is passed through B-unit 516 to result multiplexer 518.

To perform the operations A XOR B and A EQV B, a NAND or AND gate 526 and inverter 528 is added to the B-unit macro 516. To compute A XOR B and A EQV B, the B-unit 516 receives the result of the generate function 520 and the result of the propagate function 522 from latches 506 and 508, respectively. The XOR function result is (A NAND B) AND (A OR B). The EQV function result is the complement of the XOR function result. These logical operations are depicted in the truth table of Table 2.

TABLE 2

| A | B | A NAND B | A OR B | XOR | EQV |
|---|---|----------|--------|-----|-----|
| 0 | 0 | 1 | 0 | 0 | 1 |
| 0 | 1 | 1 | 1 | 1 | 0 |
| 1 | 0 | 1 | 1 | 1 | 0 |
| 1 | 1 | 0 | 1 | 0 | 1 |

Thus, an inverter and a NAND gate added to the B-unit 516 is the only dedicated circuitry required to implement all eight of the aforementioned eight logical functions. This is a result of moving the propagate and generate functions out of the adder 510 and placing them before the execution macro circuitry 509 in the order of performance. Clearly, instead of the propagate and generate functions being the OR and AND functions, respectively, they could be implemented as NOR and NAND, instead. Thus, the B-unit 516 would be equipped with an inverter 528 and a NAND gate 526 or an inverter 528 and an AND gate.

Thus, an embodiment comprises a generate function 520 preceding execution macro circuitry 509, that generates a logical AND or a logical NAND of two operands. A propagate function 522 preceding an execution macro circuitry 509, generates a logical OR or a logical NOR of the two operands. Complementation circuitry 511 within an execution macro that receives a generate function result, computes the complement of the generate function. Complementation circuitry 511 within an execution macro that receives a propagate function result, computes the complement of the propagate function. An execution macro comprising an inverter 528 and a NAND or AND gate that receives a generate function result and a propagate function result, computes a logical XOR of the two operands or a logical EQV of the two operands.

Figure 1:
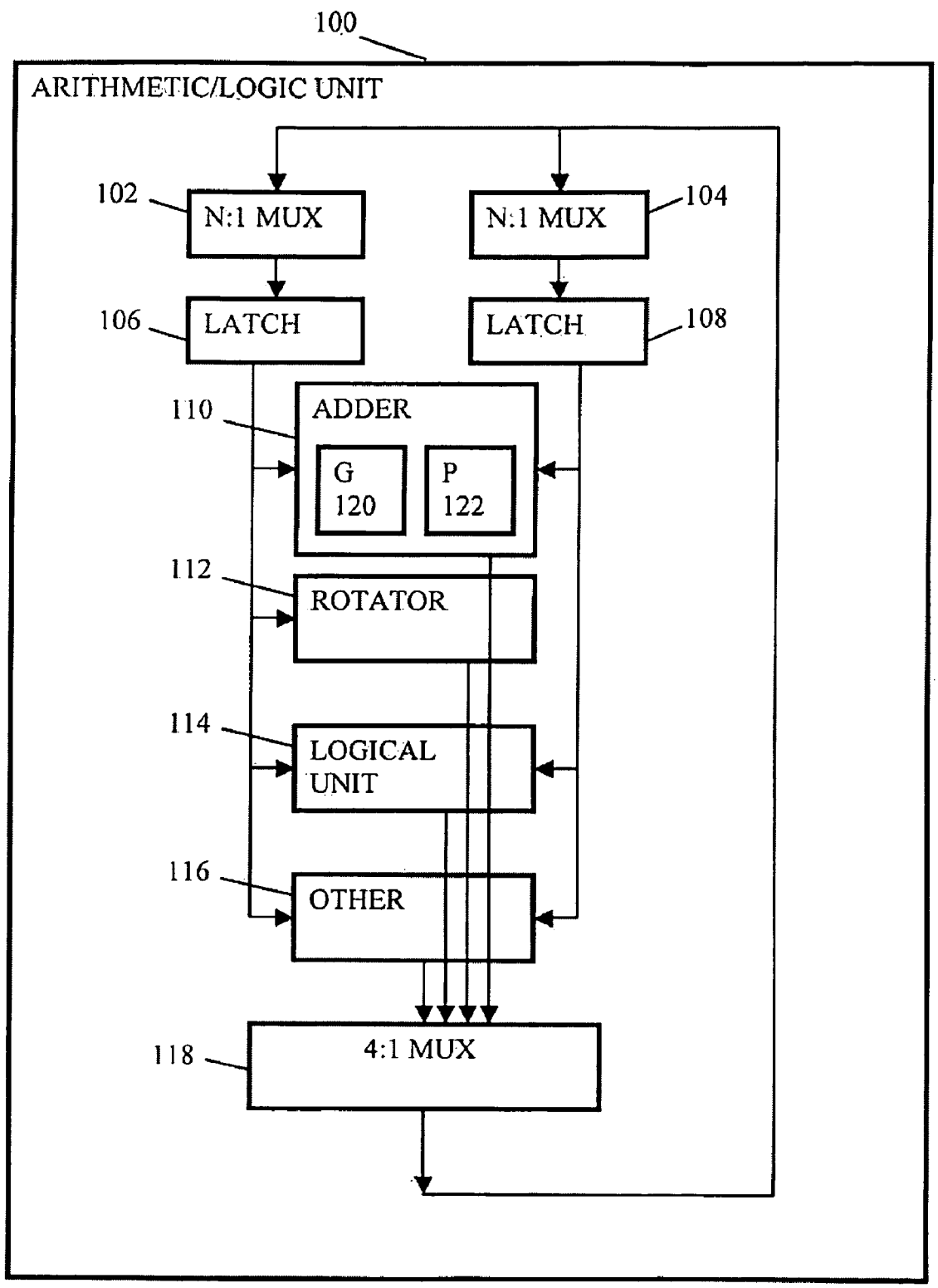
FIG. 1 depicts an arithmetic/logic unit in a digital processor.
Figure 2:
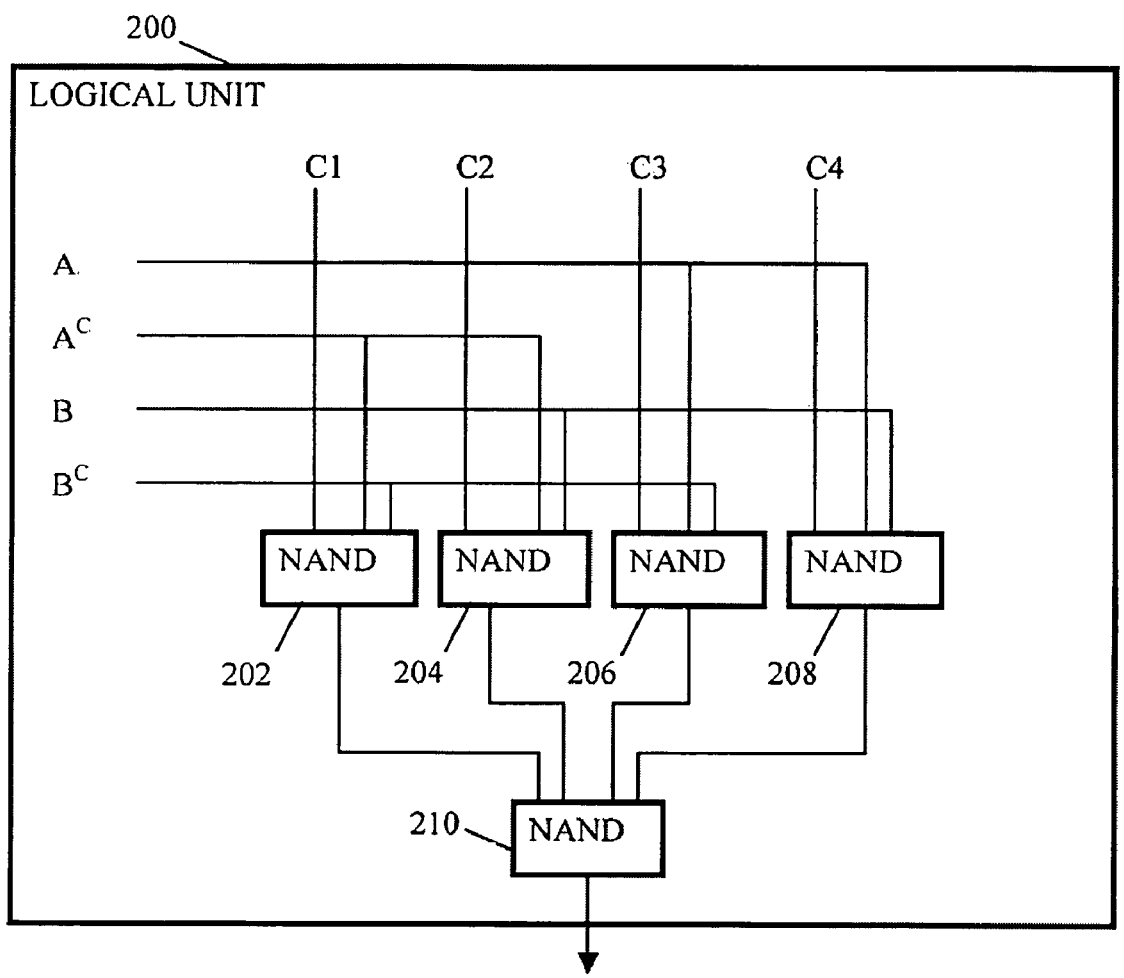
FIG. 2 depicts an implementation of logical functions in an arithmetic/logic unit.

Therefore, the embodiment of FIG. 5 produces all 8 logical operations of the PowerPC architecture ISA. This is, accomplished with considerably less circuitry than is required to implement the embodiment of FIG. 2. Embodiments implement the 8 logical operations of an ISA with almost no circuitry dedicated to this purpose. Prior designs have required many more gates and wider fan-in gates. Thus, prior designs operate slower. Embodiments of the invention also enable faster operation by shortening the overall length of the operand buses and result buses. Shorter buses mean lower capacitance and less RC delay. Less capacitance and less RC delay enables faster operation. Further, distance between logic circuits is reduced by placing the Generation and Propagation functions before the latches. This shortens the length of bus required to implement the 8 logical functions. An efficient arrangement of logic circuits that enables performance of a substantial number of logic operations is therefore disclosed.

Thus, embodiments provide a method for implementing logic in an Arithmetic/logic unit. The method comprises receiving two operands and computing a generate function result and a propagation function result. The generate function result is the logical AND or the logical NAND of the two operands. The propagate function result is the logical OR or the logical NOR of the two operands. The generate function result is transmitted to an execution macro of the arithmetic/logic unit that can compute the complement of the generate function result. The propagate function result is transmitted to an execution macro of the arithmetic/logic unit that can compute the complement of the propagate function result. The generate function result and the propagate function result are also transmitted to an execution macro of the arithmetic/logic unit that can compute a logical complement and a logical NAND or a logical AND to produce a logical XOR of the two operands and a logical EQV of the two operands.

Figure 6:
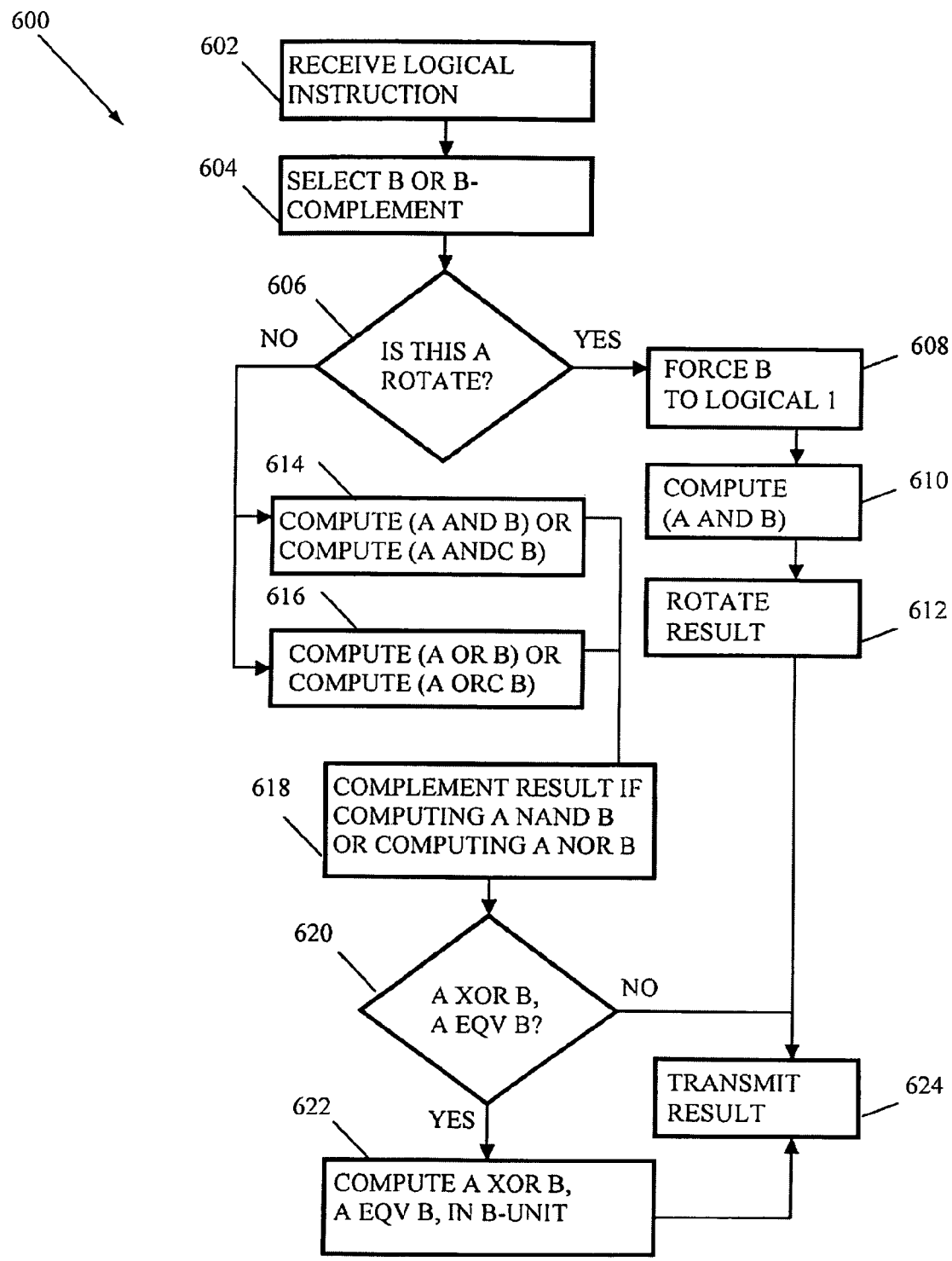
FIG. 6 depicts a flow chart for implementing logic operations in an arithmetic/logic unit.

FIG. 6 shows a flowchart 600 of the operation of an embodiment for implementing the logical functions of an ISA. In a first step, the processor receives a logical instruction, as determined by the instruction OPcode (element 602.) The system determines if the instruction to be performed requires the complement of B, (i.e., A ANDC B or A ORC B). If so, then $B^C$ (B-complement) is selected. Otherwise, B is selected (element 604). Then, the system determines if the received instruction is to rotate an operand (element 606). If so, then B is forced to logical one, (element 608.) The result of A AND B is then determined (element 610). That result is A, and A is then rotated, (element 612.) The result of the rotation is then transmitted (element 624) to a result multiplexer.

If the instruction to be performed is not a ROTATE instruction but is, rather, a logical function, then the generate function computes A AND B, if B was selected, or A ANDC B, if $B^C$ is selected (element 614). Similarly, the propagate function computes A OR B, if B was selected, or A ORC B, if $B^C$ was selected (element 616). If the function to be computed is A NAND B, then the result of A AND B is complemented (element 618.) If the function to be computed is A NOR B, then the result of A OR B is complemented (element 618.) If not computing XOR or EQV, then the result is transmitted (element 624.) Otherwise, XOR or EQV is computed in the B-unit (element 622) using the results of A AND B and A OR B. The result of the XOR function or EQV function is then transmitted (element 624).

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to output a result of a logical operation with two operands for an instruction identifying the logical operation in an arithmetic/logic unit of a processor, comprising:
   receiving, by a generate function circuit and a propagate function circuit of the arithmetic/logic unit, the two operands;
   computing, by the generate function circuit, a generate function result;
   computing, by the propagate function circuit, a propagate function result, wherein the generate function result is a logical AND and the propagate function result is a logical OR of the two operands or the generate function result is a logical NAND and the propagate function result is a logical NOR of the two operands; and
   computing the result of the logical operation to output the result, wherein computing the result comprises:
      shifting, by a rotator, the generate function result by zero to output the generate function result if the instruction identifies a logical AND or NAND operation; and
      computing, by the execution macro circuitry, a logical NAND or a logical AND of the generate function result and the propagate function result to produce a logical XOR of the two operands if the instruction identifies a logical XOR or EQV operation.

2. The method of claim 1, further comprising receiving an output of the execution macro circuitry as another operand for a subsequent instruction.

3. The method of claim 1, further comprising computing, by the execution macro circuitry, a logical complement of a logical XOR to produce a logical EQV of the two operands.

4. The method of claim 1, further comprising computing, by an adder of the execution macro circuitry, a sum of the two operands based upon the generate function result and the propagate function result.

5. The method of claim 1, further comprising receiving, from a control circuit of the arithmetic/logic unit, a control signal at a multiplexer of the arithmetic/logic unit and, in response to the control signal, forcing the multiplexer to output a logical one as a first operand of the two operands to transmit to the generate function circuit and the propagate function circuit.

6. The method of claim 5, further comprising generating the control signal is response to receiving an operation code by the arithmetic/logic unit to rotate a second operand of the two operands.

7. The method of claim 1, further comprising transmitting the generate function result to the rotator of the arithmetic/logic unit with a command to rotate the generate function result by zero.

8. An arithmetic/logic unit to output a result of a logical operation in response to an instruction identifying the operation, comprising
   a generate function circuit to receive two operands and to compute a generate function result;
   a propagate function circuit to receive the two operands and to compute a propagate function result, wherein the generate function result is a logical AND and the propagate function result is a logical OR of the two operands or the generate function result is a logical NAND and the propagate function result is a logical NOR of the two operands; and
   execution macro circuitry to receive the generate function result and the propagate function result and to compute the result of the logical operation to output the result, wherein computing the result comprises shifting, by a rotator, the generate function result by zero to output the generate function result if the instruction identifies a logical AND or NAND operation, and computing a logical NAND or a logical AND of the generate function result and the propagate function result to produce a logical XOR of the two operands if the instruction identifies a logical XOR or EQV operation.

9. The arithmetic/logic unit of claim 8, wherein the execution macro circuitry comprises an adder, a rotator, and a B-unit.

10. The arithmetic/logic unit of claim 9, wherein the rotator is responsive to a command to rotate the generate function result by zero.

11. The arithmetic/logic unit of claim 8, further comprising a control circuit coupled with a multiplexer, the control circuit responsive to an operation code associated with the two operands to generate a control signal, the control signal to force the multiplexer to output a logical one as a first operand of the two operands.

12. The arithmetic/logic unit of claim 11, wherein the control circuit outputs the control signal in response to the operation code, wherein the operation code instructs the arithmetic/logic unit to rotate a second operand of the two operands.

13. The arithmetic/logic unit of claim 8, wherein the execution macro circuitry comprises complementation circuitry to determine a complement of the generation function result, a complement of the propagation circuitry result, or both.

14. A computer system for processing instructions and data, comprising
a memory for storing the instructions and data; and
a processor coupled with the memory to process the instructions and the data, the processor comprising execution units to perform operations in accordance with the instructions, wherein the execution units comprise an arithmetic/logic unit, the arithmetic/logic unit to output a result of a logical operation in response to an instruction identifying the logical operation comprising:
a generate function circuit to receive two operands and to compute a generate function result;
a propagate function circuit to receive the two operands and to compute a propagate function result, wherein the generate function result is a logical AND and the propagate function result is a logical OR of the two operands or the generate function result is a logical NAND and the propagate function result is a logical NOR of the two operands; and
execution macro circuitry to receive the generate function result and the propagate function result and to compute the result of the logical operation to output the result, wherein computing the result comprises shifting, by a rotator, the generate function result by zero to output the generate function result if the instruction identifies a logical AND or NAND operation, and computing a logical NAND or a logical AND of the generate function result and the propagate function result to produce a logical XOR of the two operands if the instruction identifies a logical XOR or EQV operation.

15. The system of claim 14, wherein the arithmetic/logic unit further comprises a control circuit coupled with a multiplexer to replace a first operand of the two operands with a logical one in response to a rotate command.

16. The system of claim 14, wherein the execution macro circuitry comprises complementation circuitry to compute a complement of the generate function result.

17. The system of claim 14, wherein the execution macro circuitry comprises circuitry to compute a complement of the propagate function result.

18. The system of claim 14, wherein the execution macro circuitry comprises a rotator comprising circuitry to accept a command to rotate the generate function result by zero.

19. The system of claim 14, wherein the execution macro circuitry comprises circuitry to perform a sign-extension.

20. The system of claim 14, further comprising a multiplexer to select between a value and a complement of the value to transmit to the propagate function circuit as a first operand of the two operands.

* * * * *